(12) United States Patent
Durnin et al.

(10) Patent No.: US 6,545,970 B2
(45) Date of Patent: Apr. 8, 2003

(54) NEAR FIELD MAGNETO-OPTICAL HEAD HAVING READ AND WRITE PINHOLE APERTURES

(75) Inventors: James E. Durnin, Apple Valley, MN (US); Edward C. Gage, Apple Valley, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/921,531

(22) Filed: Aug. 3, 2001

(65) Prior Publication Data

US 2002/0006102 A1 Jan. 17, 2002

Related U.S. Application Data

(62) Division of application No. 09/226,886, filed on Jan. 7, 1999, now Pat. No. 6,324,129.
(60) Provisional application No. 60/070,768, filed on Jan. 8, 1998.

(51) Int. Cl.[7] .................................................. G11B 7/00
(52) U.S. Cl. ............................ 369/112.24; 369/112.23; 369/112.01
(58) Field of Search ....................... 369/112.24, 44.23, 369/44.24, 112.01, 112.08, 112.2

(56) References Cited

U.S. PATENT DOCUMENTS

| | | | |
|---|---|---|---|
| 5,150,338 A | 9/1992 | Birecki et al. ................ 369/13 |
| 5,161,134 A | 11/1992 | Lee ................................ 369/13 |
| 5,381,390 A | 1/1995 | Brucker et al. ................ 369/13 |
| 5,497,359 A | * 3/1996 | Mamin et al. ............. 369/44.15 |
| 5,689,480 A | 11/1997 | Kino ............................. 369/14 |
| 5,712,842 A | 1/1998 | Yamamoto et al. .......... 369/112 |
| 5,729,393 A | * 3/1998 | Lee et al. ..................... 369/112 |
| 5,748,574 A | 5/1998 | Chao ............................ 369/13 |
| 5,828,644 A | 10/1998 | Gage et al. .................. 369/112 |
| 5,881,042 A | 3/1999 | Knight .......................... 369/99 |
| 5,883,872 A | * 3/1999 | Kino ............................ 369/112 |
| 5,963,532 A | 10/1999 | Hajjar ......................... 369/112 |
| 5,972,461 A | * 10/1999 | Sandstorm ................... 369/112 |
| 6,044,041 A | 3/2000 | Ishizaki et al. ............... 369/13 |
| 6,069,853 A | 5/2000 | Novotny et al. ............... 369/13 |
| 6,104,675 A | 8/2000 | Hatam-Tabrizi ............. 369/13 |
| 6,111,840 A | * 8/2000 | Hajjar ......................... 369/112 |
| 6,130,864 A | 10/2000 | Burroughs ................... 369/13 |
| 6,243,350 B1 | * 6/2001 | Knight et al. .......... 369/112.24 |
| 6,266,315 B1 | * 7/2001 | Lee et al. .............. 369/112.01 |

\* cited by examiner

*Primary Examiner*—Nabil Hindi
(74) *Attorney, Agent, or Firm*—Westman, Champlin & Kelly, P.A.

(57) ABSTRACT

Disclosed is a near field optical recording head for use with light from a light source to read data from and to write data to a surface of an optical recording media. The recording head includes a slider body adapted to fly a first distance above the surface of the optical recording media, the first distance being less than one wavelength of the light from the light source. The recording head also includes separate read and write apertures having dimensions which optimize read and write functions, respectively.

14 Claims, 11 Drawing Sheets

NEAR FIELD MAGNETO-OPTICAL HEAD HAVING READ AND WRITE PINHOLE APERTURES

REFERENCE TO RELATED APPLICATION

The present application is a divisional of application No. 09/226,886, filed Jan. 7, 1999 now U.S. Pat. No. 6,324,129 which claims priority from U.S. Provisional Application Ser. No. 60/070,768 entitled METHOD AND APPARATUS FOR INCREASING THE AREAL DENSITY OF NEAR-FIELD OPTICAL DRIVES USING APERTURES, which was filed on Jan. 8, 1998.

BACKGROUND OF THE INVENTION

The present invention relates to storage devices for computer systems. In particular, the present invention relates to optical and magneto-optical storage devices.

Optical data storage disc systems are a promising technology for storing large quantities of data. The data is accessed by focusing a laser beam onto a data surface of the disc and analyzing light reflected from or transmitted through the data surface. In general, in optical storage systems, data is in the form of marks carried on the surface of the disc which are detected using the reflected laser light. The surface of the disc is patterned to represent data that is typically stored in concentric tracks around the disc. The data is read from the disc by positioning the beam of light over a particular track on the disc and sensing the intensity and polarity of the reflected light from the disc.

There are a number of different optical disc technologies which are known in the industry. For example, compact discs are currently used to store digital data such as computer programs or digitized music. Typically, compact discs are permanently recorded during manufacture. Another type of optical system is a write-once read-many (WORM) system in which a user may permanently write information onto a blank disc. Other types of systems are erasable, such as phase change and magneto-optic (M-O) systems. Phase change systems detect data by sensing a change in reflectivity. M-O systems read data by measuring the rotation of the incident light polarization due to the storage medium.

The above systems require a beam of light to be focused onto a data surface of a disc and recovering the reflected light with a sensor. Storage density is determined not only by the size of the markings on the data surface, but also by the size of the beam focused on the surface (i.e. resolution).

In order to increase areal density in an optical drive, the spot size of the optical stylus (i.e., the focused beam) can be decreased by either decreasing the wavelength $\lambda$ of light or increasing the numerical aperture (NA) of the focusing elements. Other optical techniques which either directly or indirectly reduce the effective spot size of the optical stylus are generally referred to as "superresolution" techniques.

For example, it is well known that the resolving power of a microscope can be increased by placing an aperture with a pinhole (having a diameter smaller than the focused spot size) sufficiently close to the object being observed. It was previously thought to be impractical to place a pinhole aperture in sufficient proximity to an optical disc moving at several meters per second. The goal to achieve such an effect led to the development of another form of superresolution-magnetically induced superresolution (MSR), where a pinhole-like optical readout aperture is formed in the media itself. MSR media, however, is much more difficult to manufacture than conventional M-O media and is highly sensitive to temperature variations.

As another example, tapered optical fibers are commonly used to achieve superresolution in near field scanning optical microscopy. In this case the tip of the tapered fiber acts as a sub-wavelength aperture which generates evanescent fields that can couple to the object of interest. Tapered optical fibers, however, have extremely small power transfer efficiencies. A 50 nm diameter tip fiber has a power transmission of roughly $10^{-6}$, which is 4–5 orders of magnitude less than what would typically be acceptable in an optical recording drive (due to constraints on laser power and media sensitivity).

U.S. Pat. No. 5,161,134 to Lee, entitled METHOD FOR INCREASING LINEAR BIT DENSITY IN MAGNETO-OPTICAL STORAGE MEDIA, is herein incorporated by reference. The Lee patent discloses that sliders (flying heads) can be used to position a slit at close proximity to the media surface, thereby enabling superresolution. However, to achieve super resolution using a slit optimized for reading data, low transmission of power to the media typically results. This in turn requires very large amounts of laser power to write data on the media.

SUMMARY OF THE INVENTION

Disclosed is a near field optical recording head for use with light from a light source to read data from and to write data to a surface of an optical recording media. The recording head includes a slider body adapted to fly a first distance above the surface of the optical recording media, the first distance being less than one wavelength of the light from the light source. The recording head also includes separate read and write apertures having dimensions which optimize read and write functions, respectively.

DETAILED DESCRIPTION OF THE PREFERRED EMBODIMENTS

The present invention includes the use of multiple pinhole apertures in an optical read/write head: a narrow slit for high resolution reading of data and a wider slit for efficient writing of data. The present invention can also include a circular aperture for optical component alignment. Embodiments of the present invention also include the use of a Micro Electro Mechanical System (MEMS) mirror for tracking and switching between read/write functions. The present invention can also include the addition of a solid immersion lens (SIL) as a highly efficient mechanism for focusing light onto the separate read and write apertures.

Figure 1:
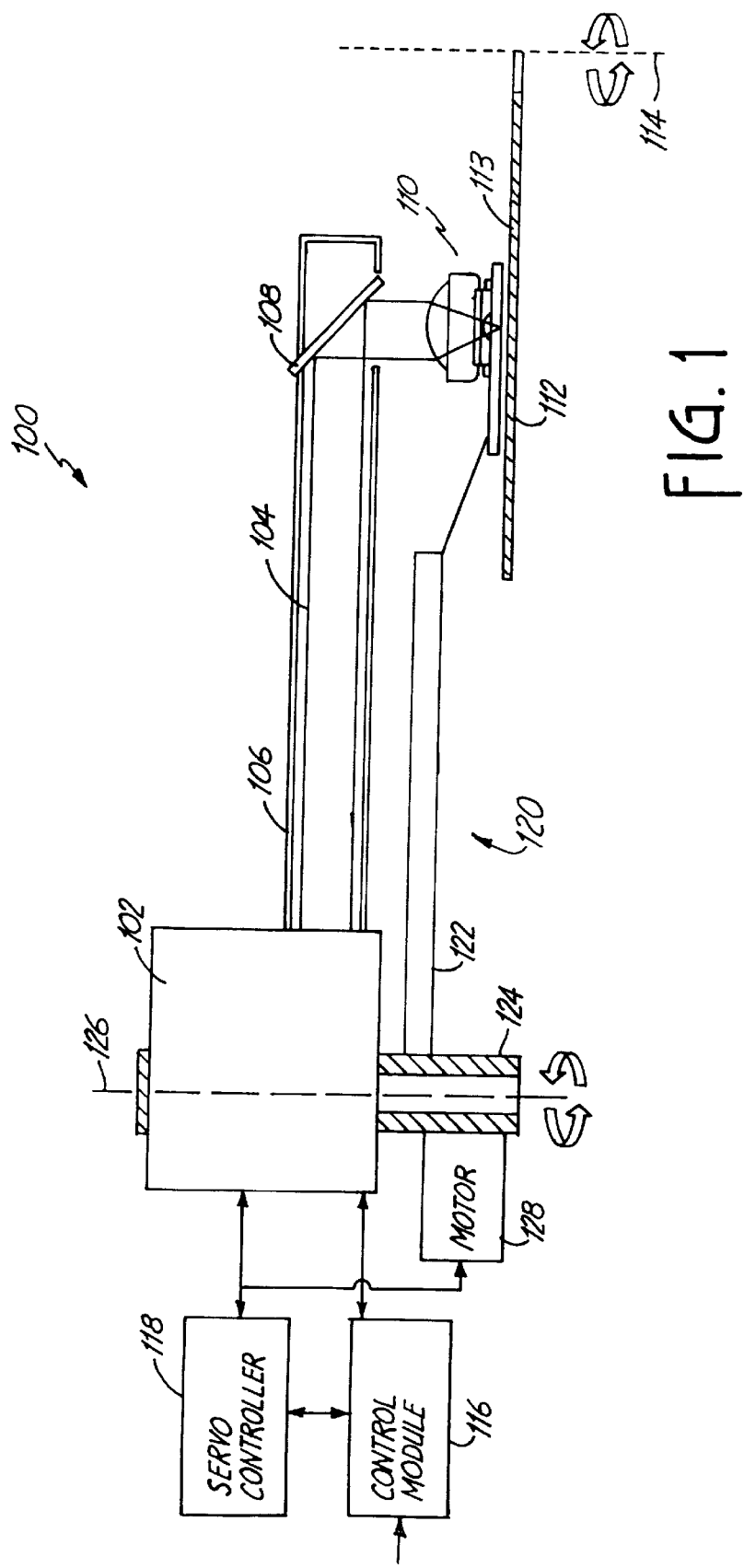
FIG. 1 is a side view of a magneto-optical disc drive incorporating the present invention.

FIG. 1 is a side view of an optical storage system 100 which implements embodiments of the present invention. An optical module 102, which includes a laser, creates a light beam 104 that is directed through an enclosed optical path 106 extending laterally from optical module 102. Light beam 104 reflects off a mirror 108 toward an optical head 110, which focuses the collimated beam into a small spot on surface 113 of a disc 112. Together, optical module 102, optical path 106 and mirror 108 provide a light beam production assembly. As illustrated in the remaining FIGS., the light beam production assembly can include other components as well.

Figure 4:
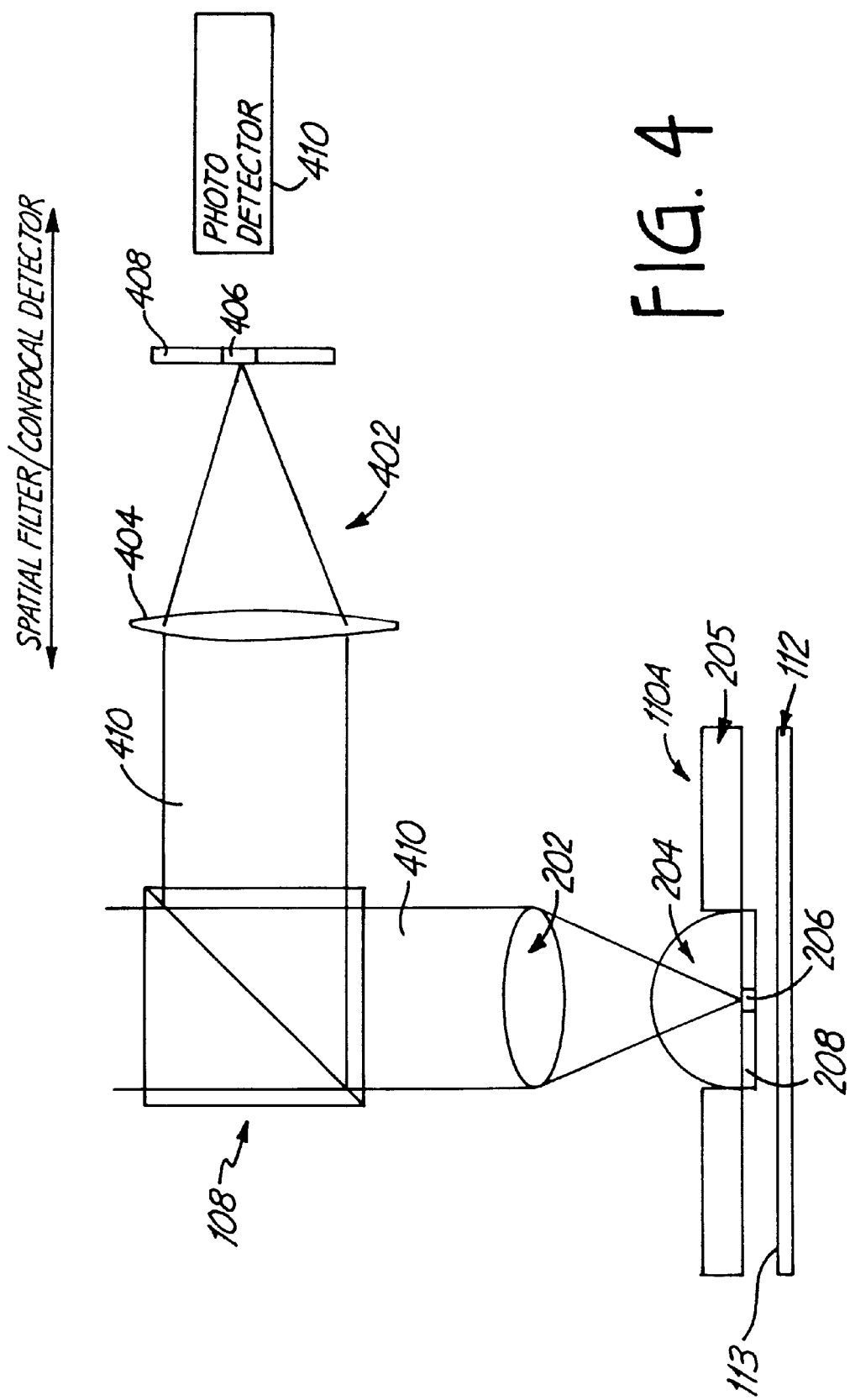
FIG. 4 is a diagrammatic illustration of an optical storage device in accordance with the present invention, which includes spatial filtering.

Disc 112 spins about a central axis 114, continuously bringing new data regions underneath the spot of light produced by optical head 110. The light incident on surface 113 of disc 112 is reflected back through enclosed optical path 106 and is analyzed by a control module 116 and a servo controller 118 attached to optical module 102. Through this process, optical storage system 100 retrieves data and servo information stored on disc 112. Optical head 110 is supported by a support assembly 120 that includes an actuator arm 122. Actuator arm 122, optical module 102, and enclosed optical path 106 are all supported by a spindle 124, which rotates about a central axis 126. As spindle 124 rotates, head 110 moves to different radial positions across disc 112 and enclosed optical path 106 rotates to remain aligned with optical head 110. Servo controller 118 rotates spindle 124 by controlling a motor 128 connected to spindle 124 based on servo information read from the disc, and a desired position produced by control module 116. Together, servo controller 118, motor 128, and spindle 124 form an actuator for positioning the head over the disc. Other features of embodiments of the present invention such as the spatial filter illustrated in FIG. 4, are also considered part of optical storage system 100.

Figure 2A:
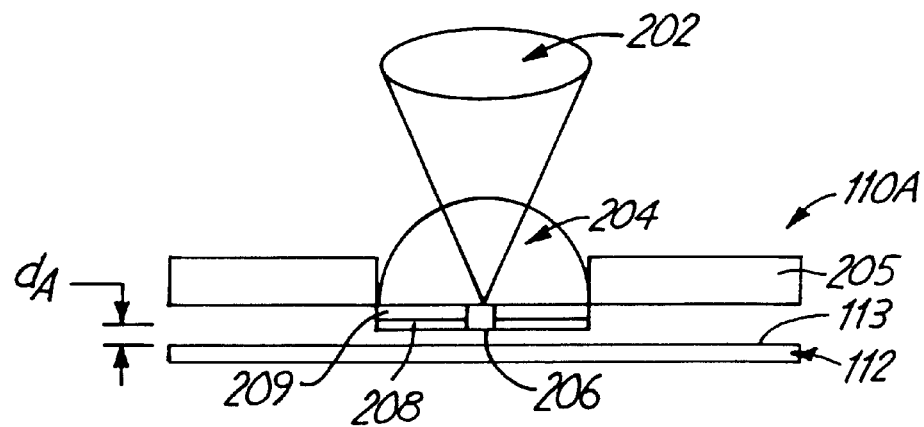
FIGS. 2A and 2B are first and second diagrammatic illustrations of the optical recording head illustrated in FIG. 1.

FIG. 2A diagrammatically illustrates how a pinhole aperture can be added to one embodiment of a near field optical recording head 110A. Recording head 110A, which diagrammatically illustrates some features of a first embodiment of head 110, includes objective lens 202 and SIL 204 mounted on or coupled to slider body 205. Aperture 206 can be formed by depositing a thin metallic film 208 on the bottom of SIL 204 and etching film 208 with a Focused Ion Beam, which is capable of producing pinholes as small as 10 nm in diameter.

Figure 2B:
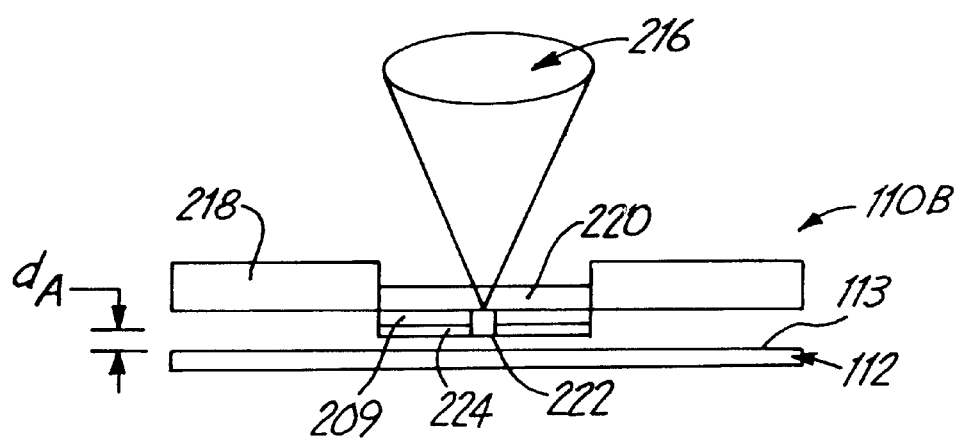

FIG. 2B diagrammatically illustrates a pinhole aperture added to a more conventional recording head having a single objective lens, but no SIL. Recording head 110B, which diagrammatically illustrates some features of a second embodiment of head 110, includes objective lens 216 and optical substrate 220 mounted on or coupled to slider body 218. Aperture 222 is formed in metallic layer 224 deposited and etched on optical substrate 220. Optical substrate 220 can be made from any of a wide variety of known light transmissive substrate materials and can be of arbitrary thickness, provided that the spherical aberration introduced by the substrate is accounted for in the design of the objective lens. Pinhole apertures 206 and 222 can have circular, rectangular, or other shapes. Characteristics of pinhole apertures 206 and 222, as well as other features of heads 110, 110A and 110B which are not illustrated in FIGS. 1, 2A and 2B, are discussed below. Further, optional thin film optical stack 209, which can be included in either of heads 110A or 110B, are discussed below with reference to FIG. 4.

To be effective, the pinhole aperture dimensions must be smaller than the focused spot size on surface 113 of disc 112, and the distance $d_A$ (see FIGS. 2A and 2B) from the pinhole aperture to surface 113 must be well within the depth of field of the beam diffracted by the aperture. The near field optical recording heads of the invention fly at less than one wavelength of the light source above the disc surface. The increase in areal density afforded by superresolution is obtained at the expense of the laser power that can be delivered to the disc. The aperture transmission τ for a focused spot assumed to Gaussian (Full-Width-at-Half-Maximum=F) and a pinhole assumed to be circular (diameter=D) is given by:

$$\tau = 1 - \left(\frac{1}{2}\right)^{(D/F)^2} \qquad \text{Equation 1}$$

Figure 3:
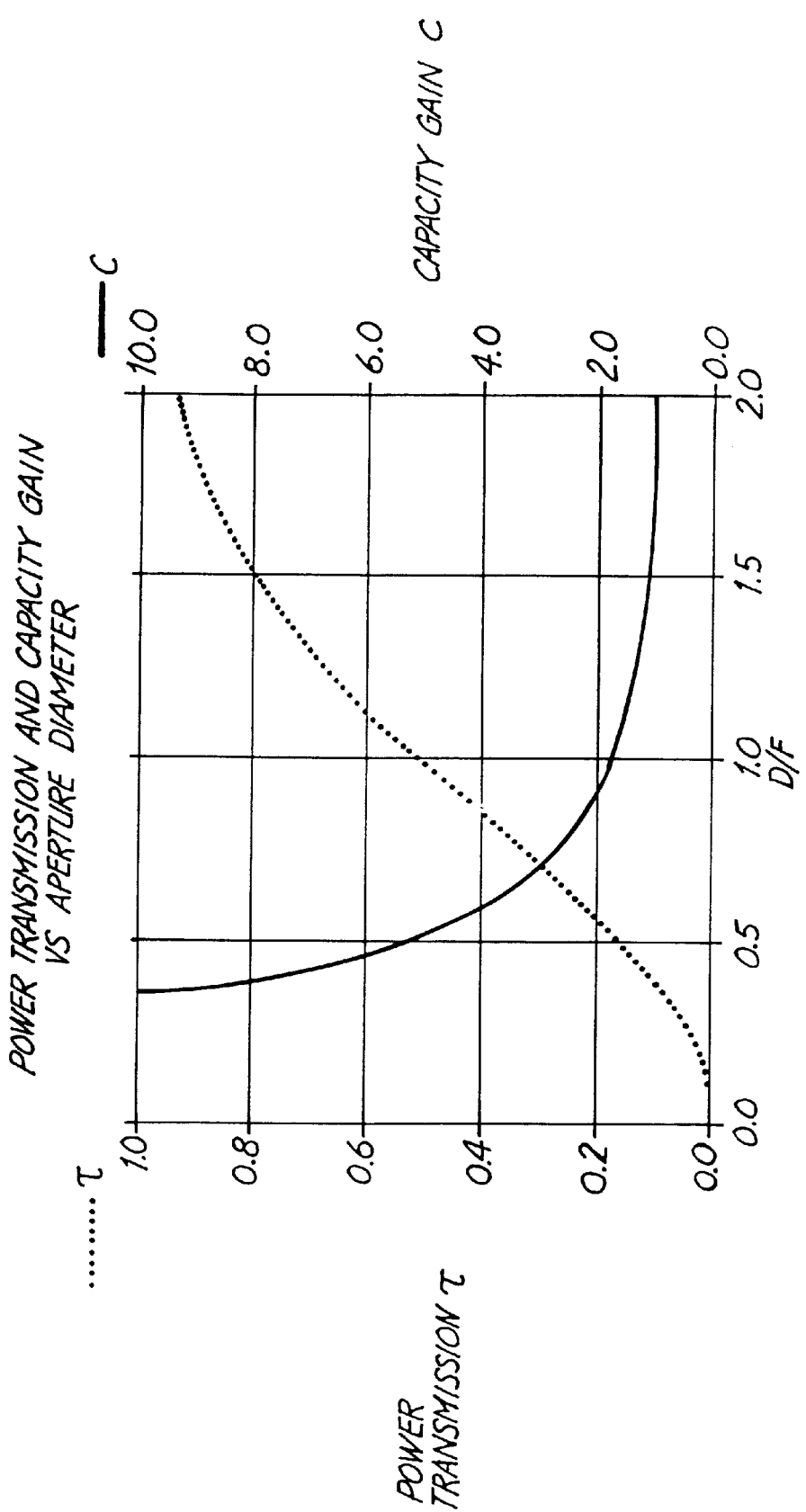
FIG. 3 is a plot illustrating power transmission and capacity gain as a function of aperture diameter.

This relationship is plotted in FIG. 3. Note that the fraction of power transmitted by the aperture which actually couples into the media is a strong function of the media design and fly height.

The light which is internally reflected within the recording head at the pinhole aperture (referred to herein as the retro-reflected beam) will add coherently to the light which is reflected from the media and transmitted back through the aperture. In general, the optical media can be optimized to account for the presence of the retro-reflected beam. However, if the retro-reflected beam does have a negative impact on the data readout signals, it can be substantially reduced using spatial filtering as shown in FIG. 4.

FIG. 4 illustrates head 110A with a spatial filter 402 to reduce the negative impact of the retro-reflected beam on the data readout signals. Spatial filter 402 includes lens 404 and second pinhole aperture 406 formed in layer or material 408. Light beam 410 from light reflected at disc surface 113 through pinhole aperture 206, SIL 204 and objective lens 202 is indicative of data read from surface 113. Light beam 410 is reflected toward filter 402 by mirror 108. Filter 402 receives light beam 410 and lens 404 focuses light beam 410 on pinhole aperture 406 to thereby reduce the impact of the retro-reflected beam on the data readout signal communicated in light beam 110.

Pinhole aperture 206 is imaged with some magnification factor M>1 onto pinhole aperture 406, and the diameter of pinhole aperture 406 is chosen to be a factor of M larger than that of pinhole aperture 206. In the case of phase change media, only a density signal (also called central aperture or sum signal) is required, and photo detector 410 can be placed behind pinhole aperture 406. Light transmitted through pinhole aperture 406, have a reduced retro-reflected beam effect, is detested by photo detector 410 for retrieval of information stored on disc 112. For M-O media, the beam transmitted by pinhole aperture 406 must be at least partially recollimated and passed through the standard optics required for differential detection.

As an alternative to the spatial filtering illustrated in FIG. 4, additional thin-film coating 209 on the bottom of the SIL 204 (FIG. 2A) or substrate 220 (FIG. 2B) can be added to reduce the reflected light or to convert the retro-reflected light to enhance the signal amplitude during reading. The pinhole apertures 206 and 222 are also formed in thin film optical stack 209 and act as a partially reflective mask. Optical stack or coating 209 optimizes performance during reading by converting the phase of the retro-reflected light such that light from the reflective portion of the mask adds coherently to light reflected from the disc surface and passing through the pinhole aperture. The result is enhanced read signal amplitude.

Figure 5A:
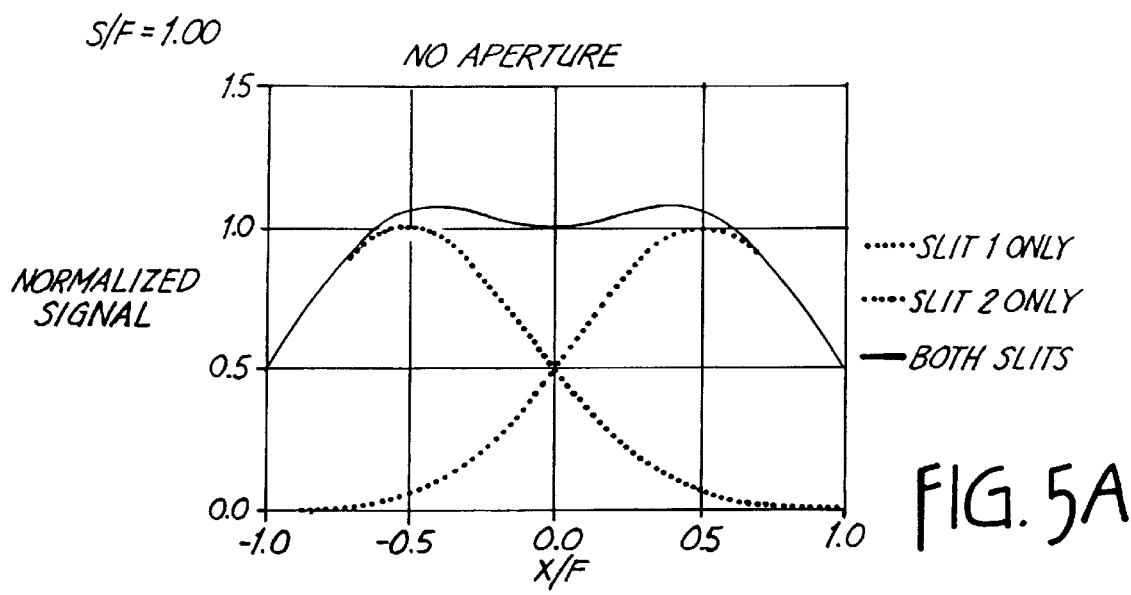
FIGS. 5A through 5D are plots illustrating features of the present invention.
Figure 5B:
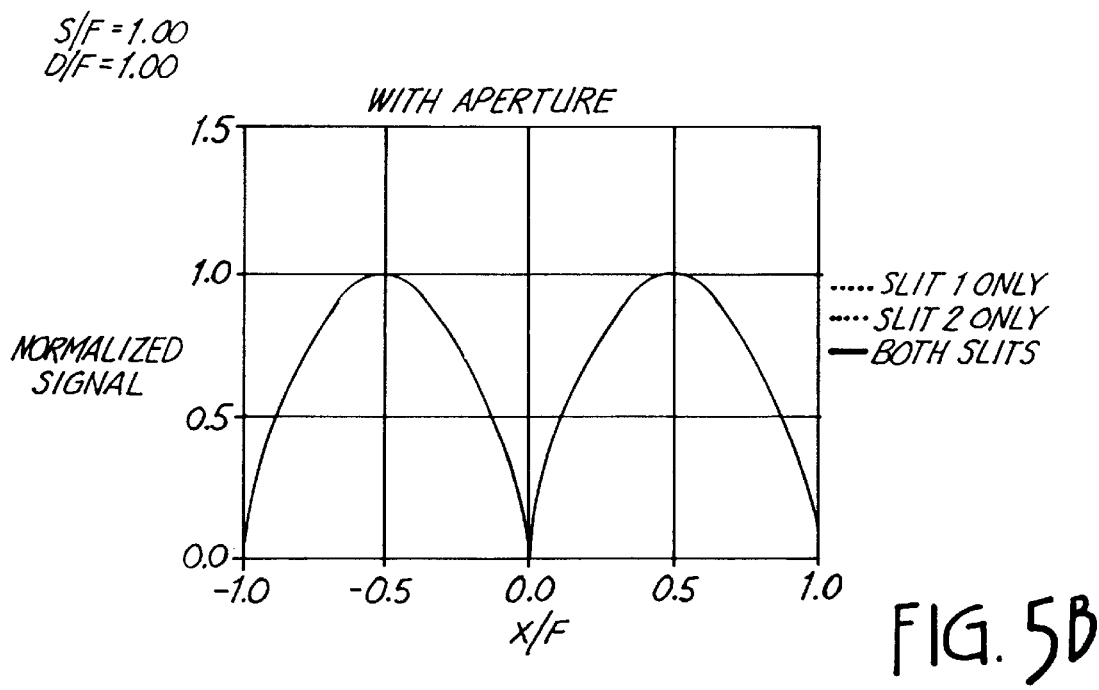

As a rough estimate of how much spatial resolution is gained by using a pinhole aperture, consider the case where two reflective delta-function slits located on the disc surface at an in-track location or distance are to be separately identified (resolved) and assume a simple convolutional model for readout. In FIGS. 5A–5D the two reflective delta function slits on the disc surface to be identified are assumed to be separated in an in-track direction by a distance S=F, where F is the Full-Width-at-Half-Maximum (FWHM) of the Gaussian beam, and are assumed to be located at an in-track position or distance X (where X=±0.5F). Based on the Sparrow criteria for resolution (see T. R. Corle and G. S. Kino, "Confocal Scanning Optical Microscopy and Related Imaging Systems," p. 24, Academic Press 1996), the two peaks are now just barely resolved. According to this criterion, two peaks are just resolved when the signal level at the midpoint equals the maximum value of either peak measured separately. FIG. 5B illustrates that when a circular aperture of diameter D=F is added, the same two slits are much better resolved. In fact, there is no inter symbol interference at all in this particular case.

Figure 5C:
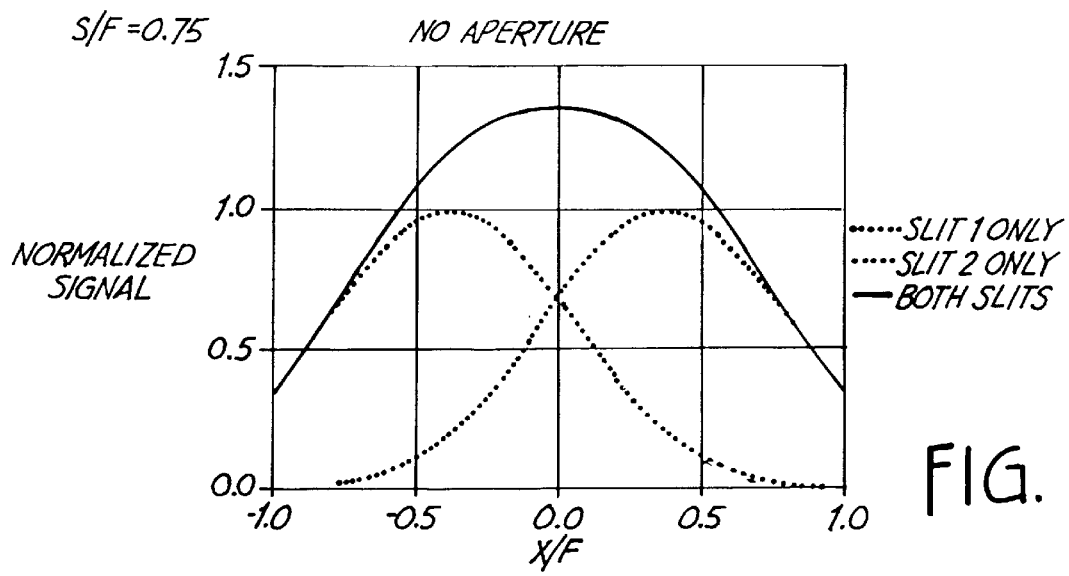
Figure 5D:
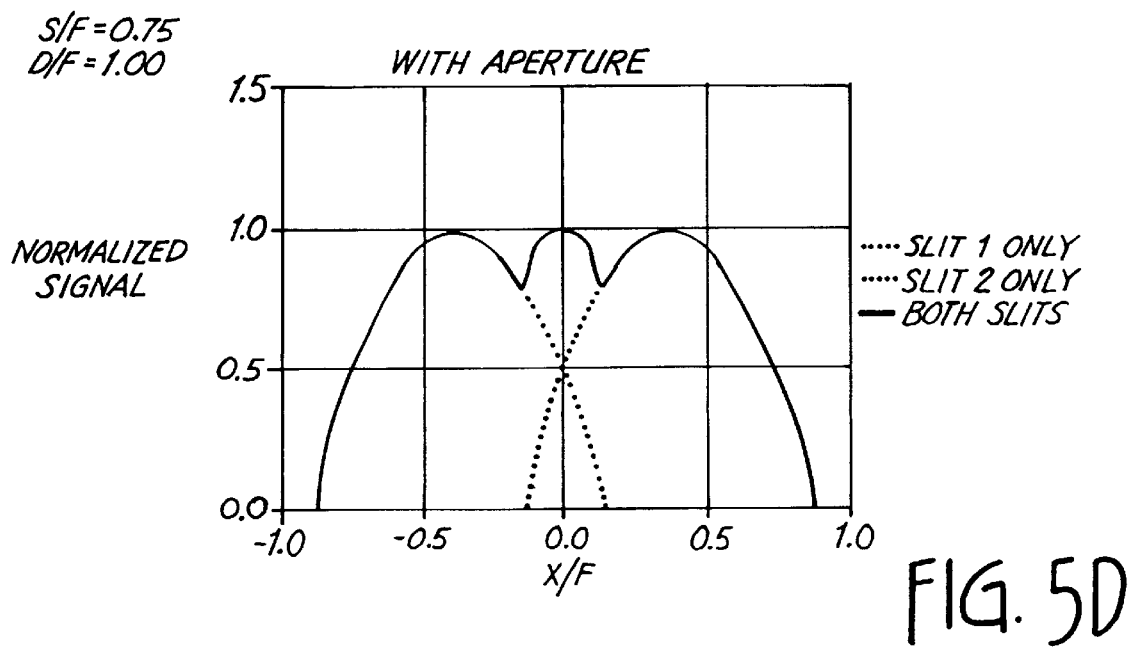

To quantify the improvement in resolution due to the aperture, it must be determined how much the slit separation S can be reduced so that the two peaks are again just barely resolved. In FIGS. 5C and 5D, it can be seen that when the slit separation is reduced by 25%, the peaks are just barely resolved using the D=F aperture, and not at all resolvable without an aperture. This means that the spatial resolution has increased by a factor of 1/0.75=1.33, and thus the areal density and disc capacity can increase by a factor of $(1/0.75)^2=1.78$ beyond that which is achievable without the aperture.

Figure 6A:
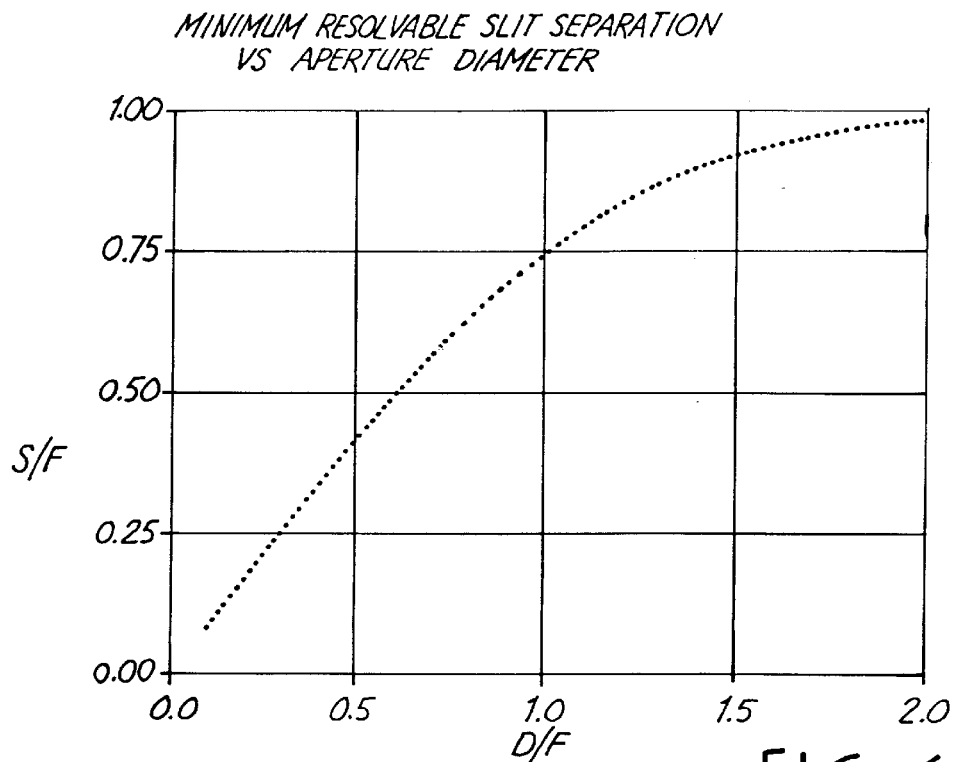
FIG. 6A is a plot illustrating minimum resolvable slit separation as a function of aperture diameter.
Figure 6B:
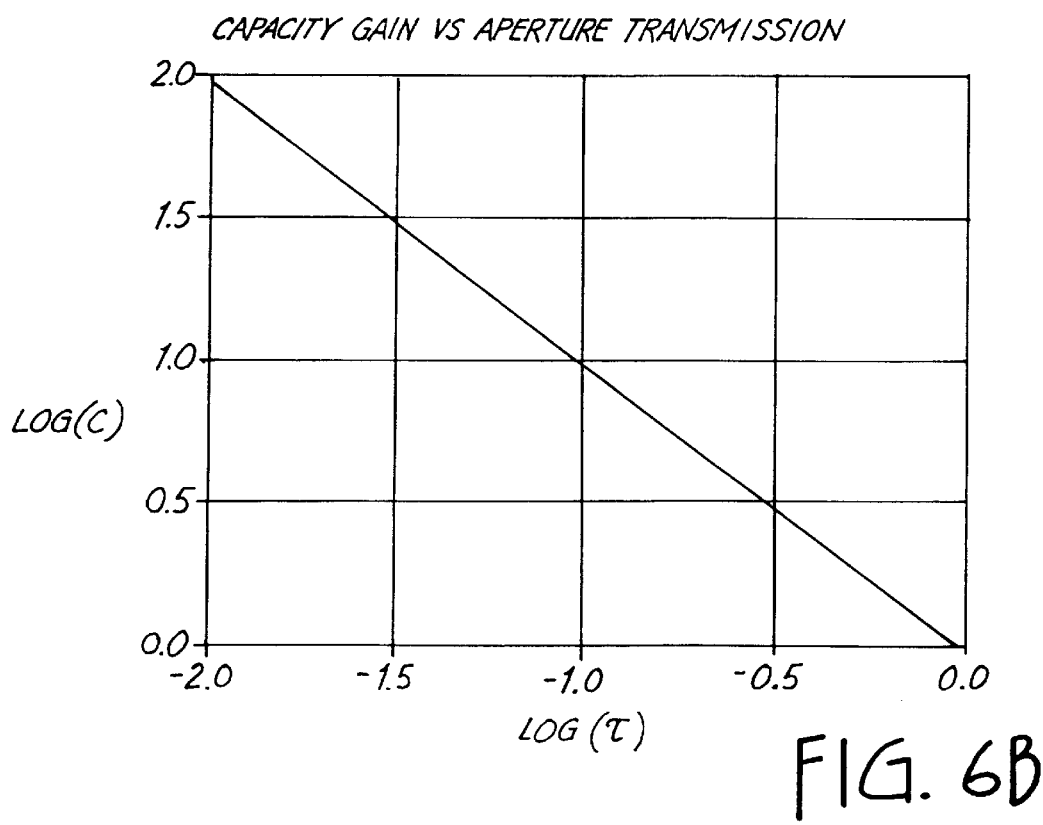
FIG. 6B is a plot illustrating capacity gain versus aperture transmission.

FIG. 6A is a plot illustrating the minimum resolvable slit separation S versus aperture diameter D. Using the relationship illustrated, one can obtain from this the estimated Areal Density or Capacity Gain C shown in FIG. 3. FIG. 6B shows that the capacity gain C is simply proportional to the reciprocal of the aperture transmission τ. The following Examples further illustrate these features of the invention:

EXAMPLE 1

For an optical head 110A such as shown in FIG. 2A, assume a laser wavelength of 830 nm, which is very attractive for this application since devices capable of supplying 100 mW are currently commercially available. Assume also that the objective lens has a moderate numerical aperture (NA)=0.55, and that the index of the SIL is N=2.0. The FWHM of the focused beam is then F≈415 nm and this would afford an areal density on the order of 5 Gb/in². If one assumes that 10 mW of power will be required at the disc, and that the optical head is 50% efficient at getting light from the laser to pinhole aperture 206, then the transmission of the aperture must be at least 20%. From FIG. 3 it can be seen that τ=20% requires a pinhole diameter D≈250 nm, and this produces an areal density increase C of approximately 4 times, or 20 Gb/in².

Figure 7:
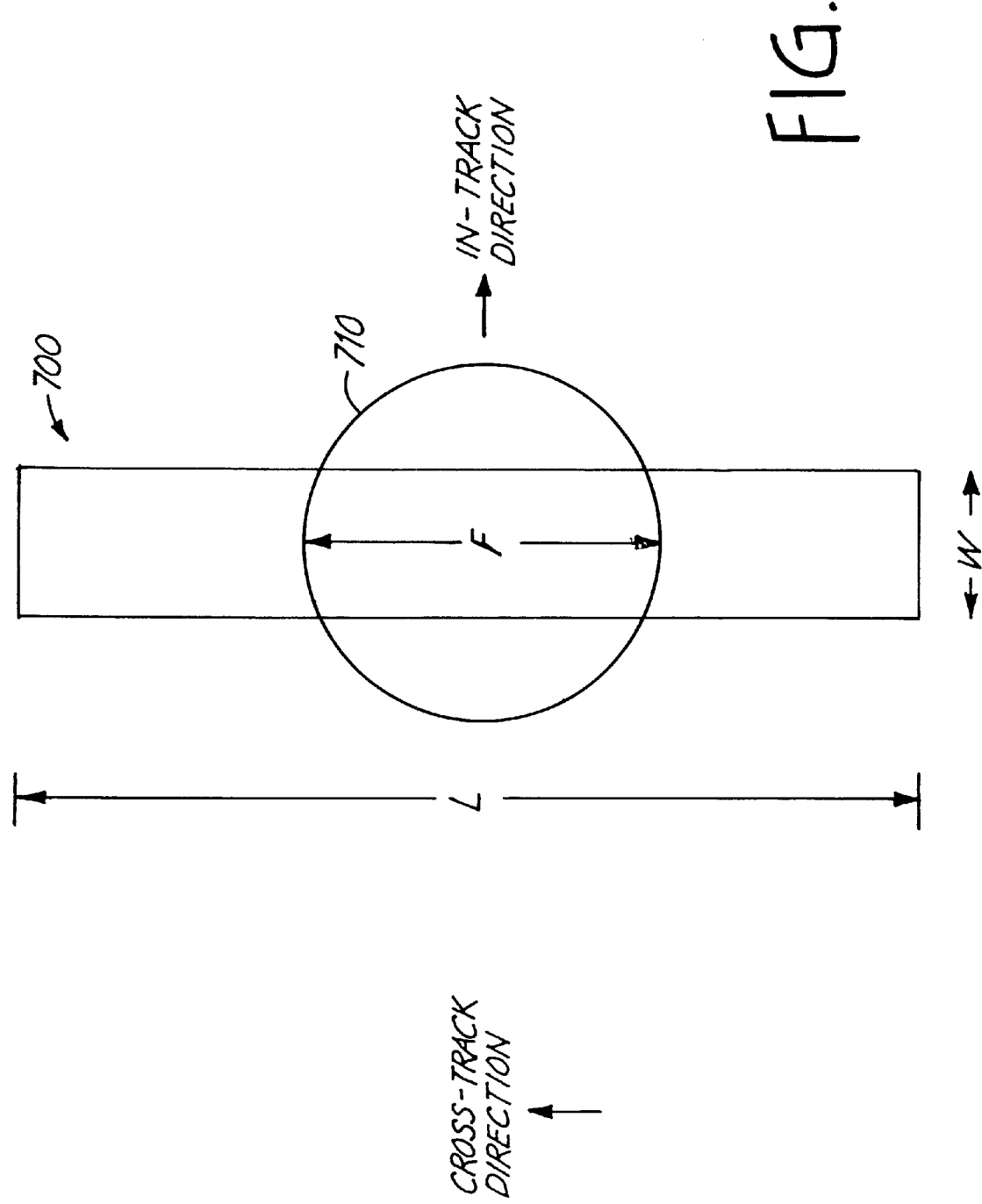
FIG. 7 is a diagrammatic illustration of a rectangular slit aperture used in the present invention.

To allow for tracking, a servo can be used which moves the entire slider and attached optics in the cross-track direction. On the other hand, in order to use conventional tracking servos which displace the focused spot along the cross-track direction, a rectangular slit aperture can be used instead of a circular aperture. FIG. 7 illustrates rectangular slit aperture 700 which can be used as pinhole apertures 206 and 222. Referring to the geometry shown in FIG. 7, slit length L of pinhole aperture 700 can be any value greater than or equal to T+2F, where T is the desired tracking range. Slit length L is chosen to be large enough to accommodate expected track variations due to disc decentering and spindle runout. In general, it is preferred that length L of aperture 700 be as large as possible in order to increase the tolerance for centering the focused beam or spot 710 along the length of the slit aperture 700. Assuming that L is very large compared to F (the diameter of the spot focused on surface 113), the transmission τ of the slit as a function of the slit width W relative to the FWHM of the focused spot is given by:

$$\tau = \mathrm{erf}\left(\sqrt{\ln 2 \frac{W}{F}}\right)$$

Figure 8:
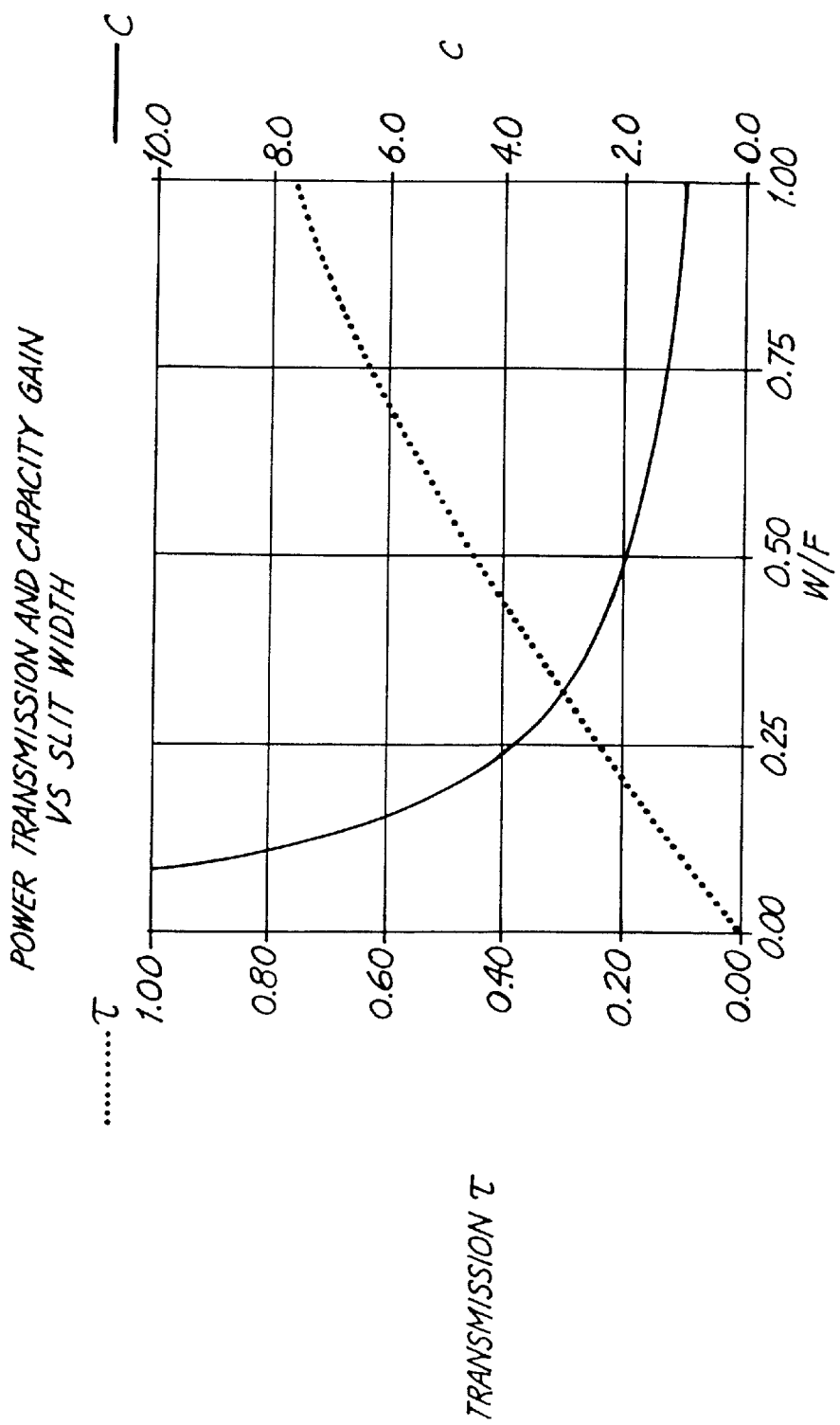
FIG. 8 is a plot illustrating power transmission and capacity gain as functions of slit width.

Again using the Sparrow criterion, the in-track slit width W produces a spatial resolution enhancement F/W (for W≦F) along the in-track direction. The areal density and capacity of the disk therefore increase by that same factor. FIG. 8 illustrates the aperture transmission and capacity increase C as a function of W/F.

When using a rectangular slit aperture, the retro-reflected beam can be reduced using a spatial filter as shown in FIG. 4. With rectangular slit apertures, pinhole 206 and its image pinhole 406 are replaced by first and second rectangular slits.

EXAMPLE 2

If, as in example 1, one wishes to increase the areal density by a factor of four then using the relationship illustrated in FIG. 8 a slit must be chosen which has a width W=F/4, and the transmission τ of the aperture will be approximately 24%.

Figure 9:
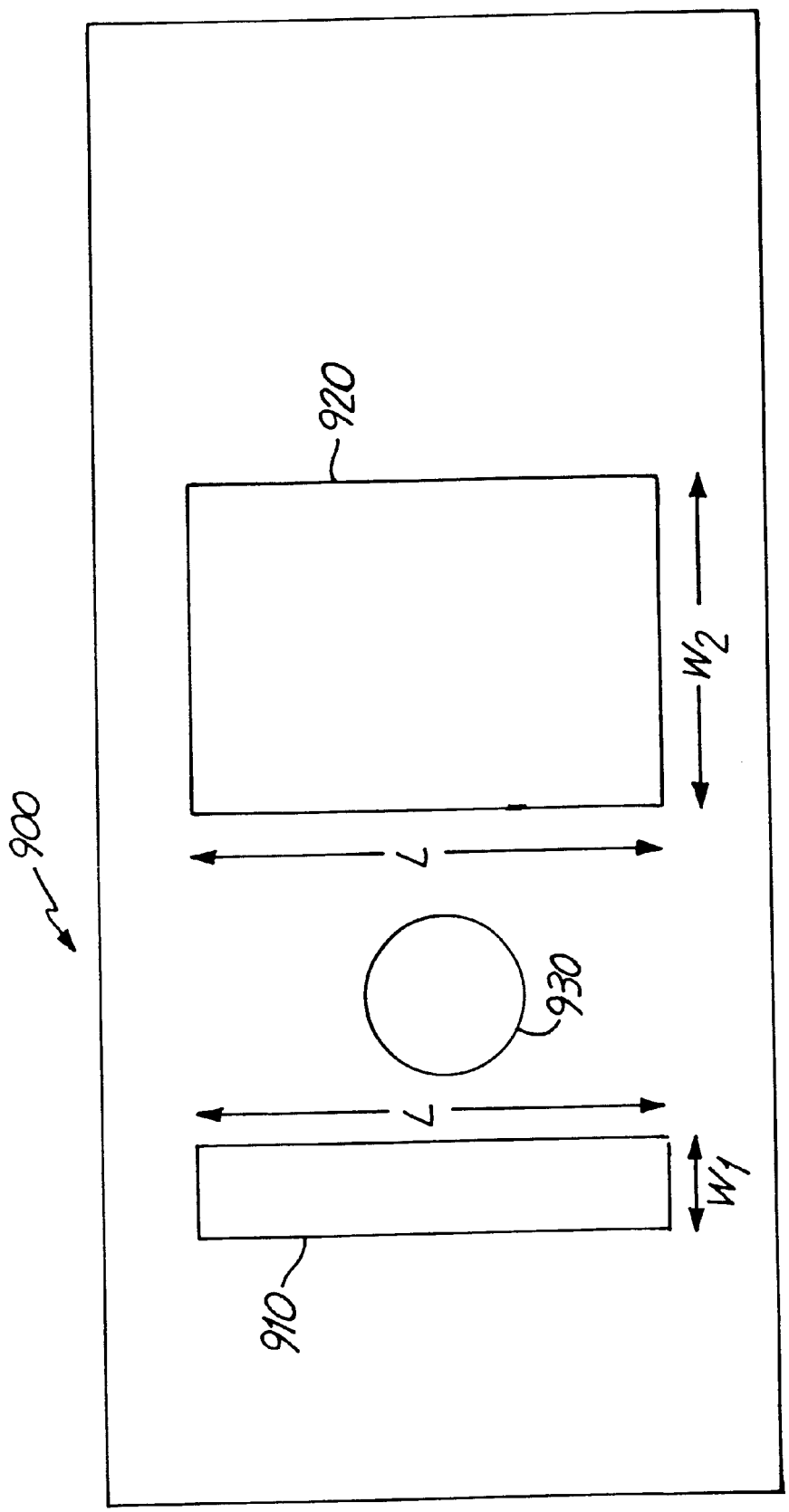
FIG. 9 is a diagrammatic illustration of an optical mask which forms separate read and write rectangular slit apertures, as well as an alignment pinhole aperture.

In order to provide optimum use of laser power during readout from and writing to the media, separate read and write slit apertures are proposed as shown in FIG. 9. Optical mask 900, which is for example formed using metallic films or layers 208 and 224 in heads 110A and 110B, defines readback rectangular slit aperture 910, write rectangular slit aperture 920, and circular alignment aperture 930. FIG. 9 presents a bottom view of optical mask 900, and therefore is indicative of a bottom view of an embodiment of the optical recording heads of the invention.

By using narrow slit 910 for readback, high resolution of written data can be achieved. In practice however, narrow slit 910 will produce low transmission of power to the media and thus require very large, and perhaps unattainable, amounts of laser power to permit writing of data on surface 113 of media 112. Therefore write slit aperture 920, which is wider than readback slit aperture 910, is included to permit efficient writing of data. Write slit aperture 920 is in a preferred embodiment between two and eight times wider than read slit 910 (i.e., $2W_1 < W_2 < 8W_1$), but still less than the FWHM of the incident focused beam.

The wider writing slit 920 allows for higher transmission of laser power to heat the media 112 when writing data. When used in combination with Magnetic Field Modulation (MFM)—where the magnetization of the media is dynamically changed by changing the magnetic field applied to the media—sharp transitions are obtained between marks (i.e., between data domains on the media). The high resolution afforded by the sharp transitions can then made resolvable by the narrow slit 910 used to read the data.

Figure 10:
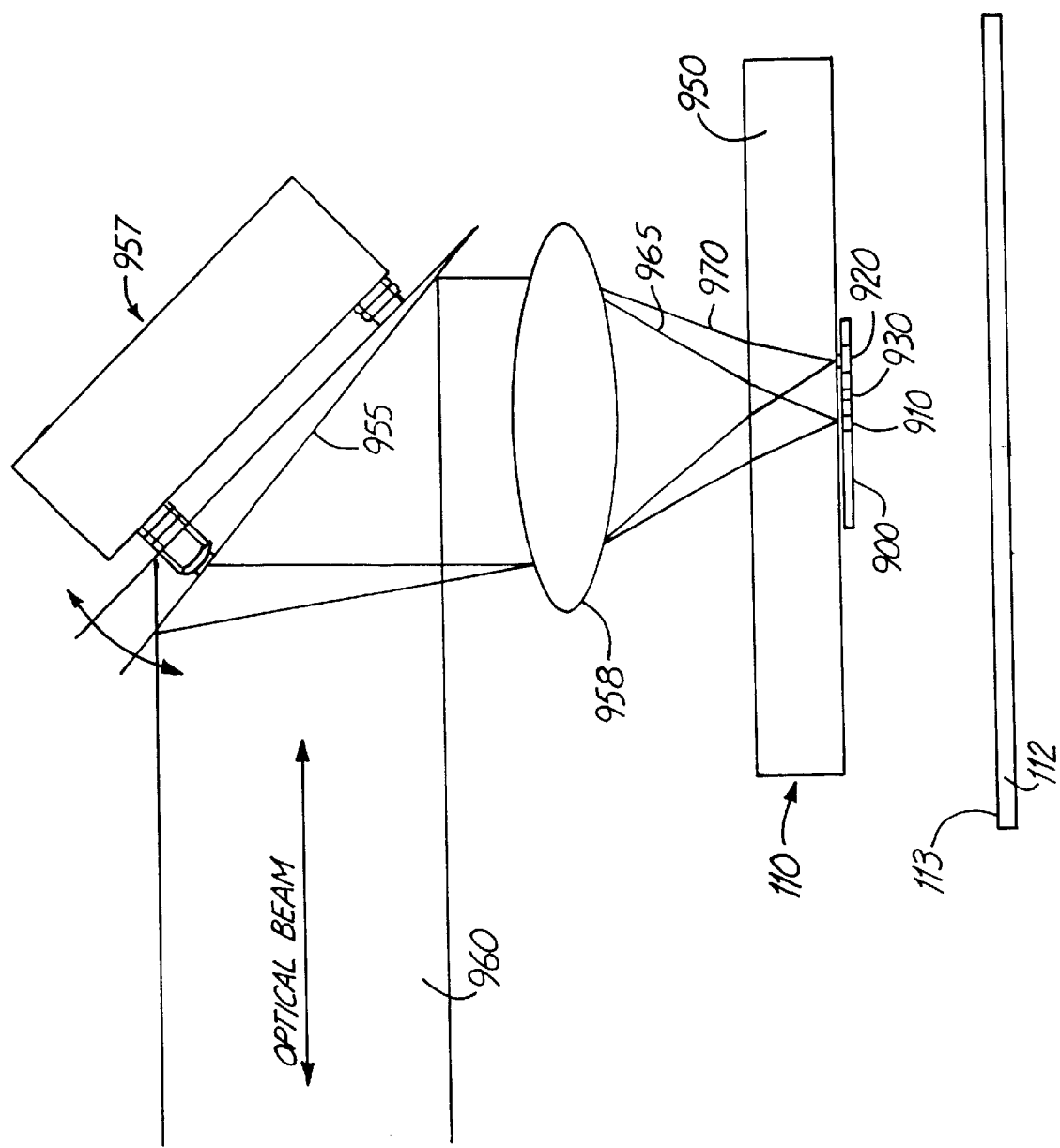
FIG. 10 is a diagrammatic illustration of the optical mask shown in FIG. 9 in use with a recording head of the present invention.

FIG. 10 is a diagrammatic illustration of head 110 having optical mask 900 formed on a bottom surface of the slider body 950 of head 110. The representation of optical mask 900 on the slider body of head 110 is intended to represent both the optical mask embodiments illustrated in FIGS. 2A and 2B. Therefore, optical mask 900 can be formed on either of a bottom surface of SIL 204 (FIG. 2A) or on a bottom surface of substrate 220 (FIG. 2B).

As illustrated in FIG. 10, a turning mirror 955 attached to a 2-axis micro electromechanical system (MEMS) device 957 redirects light beam 960 toward objective lens 958, which focuses the beam on the apertures of optical mask 900. MEMS device 957 is used for: 1) tracking during read operations, by sweeping the focused beam along the lengths L of slit aperture 920, and 2) switching between read to write modes by sweeping the beam in the perpendicular direction between the read and write slits 920 and 910.

In order to provide for the initial optical alignment of the slit apertures, pinhole aperture 930 is placed between the reading slit aperture 920 and the writing slit aperture 910. When the pinhole aperture 930 is illuminated from below the slider with a focused beam, the optical components above the slider (e.g., SIL collimating lens, etc) can be properly aligned with respect to the slits.

Although the present invention has been described with reference to preferred embodiments, workers skilled in the art will recognize that changes may be made in form and detail without departing from the spirit and scope of the invention. For example, each of the various recording head embodiments illustrated in the FIGS. should be construed to include the separate read and write pinhole apertures discussed above. Also, each of the pinhole apertures can be any of a variety of shapes (including circular and rectangular, for example) and can have a wide range of dimensions.

What is claimed is:

1. A near field optical recording head for use with light from a light source to read data from and write data to a surface of an optical recording media, the recording head comprising:
   a slider body adapted to fly a first distance above the surface of the optical recording media, the first distance being less than one wavelength of the light from the light source; and
   read/write aperture means for focusing light from the light source on the surface of the media, wherein the read/write aperture means comprises a first aperture for focusing light from the light source onto the media for reading data, and a second aperture for focusing light from the light source onto the media for writing data, wherein the first aperture and second aperture are separated from one another in an in-track direction defined by data tracks on the surface of the media.

2. A near field optical recording head for use with light from a light source to read data from and write data to a surface of an optical recording medium, the recording head comprising:
   a slider body to fly a first distance above the surface of the optical recording medium, the first distance being less than one wavelength of the light from the light source;
   a first means for focusing the light from the light source onto the surface of the medium, optimized for reading data from the surface of the medium; and
   a second means for focusing the light from the light source onto the surface of the medium, optimized for writing data to the surface of the medium.

3. The near field optical recording head of claim 2, wherein the second means for focusing the light provides a predetermined minimum write power to the surface of the optical storage medium with a switchable magnetic field to enable thermally assisted magnetic field modulation recording.

4. The near field optical recording head of claim 2, wherein the first means for focusing the light and the second means for focusing the light a are separated from one another in an in-track direction defined by data tracks on the surface of the medium.

5. The near field optical recording head of claim 2, wherein the second means for focusing the light has an in-track width of between about 0.05 micron and about 0.70 micron.

6. The near field optical recording head of claim 2, wherein the second means for focusing the light has an in-track width of between 0.050 micron and 0.700 micron.

7. The near field optical recording head of claim 2, wherein the second means for focusing the light has a cross-track length of between about 1 micron and about 100 microns.

8. The near field optical recording head of claim 2, wherein the second means for focusing the light has a cross-track length of between 1.0 micron and 100.0 microns.

9. The near field optical recording head of claim 2, wherein the first means for focusing the light has an in-track width of between about 0.01 micron and about 0.50 micron.

10. The near field optical recording head of claim 2, wherein the first means for focusing the light has an in-track width of between 0.010 micron and 0.500 micron.

11. The near field optical recording head of claim 2, wherein the second means for focusing the light has a cross-track length of between about 1 micron and about 100 microns.

12. The near field optical recording head of claim 2, wherein the second means for focusing the light has a cross-track length of between 1.0 micron and 100.0 microns.

13. The near field recording head of claim 2, wherein the first means for focusing the light further comprises a substantially rectangular aperture.

14. The near field recording head of claim 2, wherein the second means for focusing the light further comprises a substantially rectangular aperture.

* * * * *